United States Patent
Jayaprakash

(10) Patent No.: US 10,721,146 B2
(45) Date of Patent: Jul. 21, 2020

(54) MONITORING FOR MANAGED SERVICES

(75) Inventor: Arun Jayaprakash, Bangalore (IN)

(73) Assignee: MICRO FOCUS LLC, Santa Clara, CA (US)

( * ) Notice: Subject to any disclaimer, the term of this patent is extended or adjusted under 35 U.S.C. 154(b) by 519 days.

(21) Appl. No.: 14/408,838

(22) PCT Filed: Jul. 31, 2012

(86) PCT No.: PCT/IN2012/000535
§ 371 (c)(1),
(2), (4) Date: Dec. 17, 2014

(87) PCT Pub. No.: WO2014/020612
PCT Pub. Date: Feb. 6, 2014

(65) Prior Publication Data
US 2015/0188789 A1    Jul. 2, 2015

(51) Int. Cl.
*H04L 12/26*  (2006.01)
*G06F 11/30*  (2006.01)
*G06F 11/00*  (2006.01)

(52) U.S. Cl.
CPC .......... *H04L 43/08* (2013.01); *G06F 11/3003* (2013.01); *G06F 11/3093* (2013.01); *G06F 11/006* (2013.01); *G06F 2201/865* (2013.01)

(58) Field of Classification Search
CPC . H04L 43/08; H04L 63/1408; H04L 41/0213; H04L 41/0806; H04L 41/0843; G06F 11/3003; G06F 11/3093; G06F 11/006; G06F 2201/865; G06F 11/3051
USPC ........................................................ 709/224
See application file for complete search history.

(56) References Cited

U.S. PATENT DOCUMENTS

| | | | | |
|---|---|---|---|---|
| 7,860,968 B2* | 12/2010 | Bornhoevd | ........... | G06F 9/5088 709/224 |
| 8,131,838 B2* | 3/2012 | Bornhoevd | ............... | G06F 9/54 709/217 |
| 8,625,757 B1* | 1/2014 | Karpov | ................. | H04M 15/58 379/112.06 |
| 9,118,538 B1* | 8/2015 | Lekkalapudi | ......... | H04L 67/025 |
| 2005/0022022 A1* | 1/2005 | Mendonca | .............. | G06F 21/55 726/4 |
| 2006/0080412 A1* | 4/2006 | Oprea | ................. | H04L 41/0843 709/220 |
| 2007/0093916 A1* | 4/2007 | Sanghvi | ................. | G06F 11/30 700/17 |

(Continued)

FOREIGN PATENT DOCUMENTS

| CN | 101118502 | 2/2008 |
|---|---|---|
| CN | 101833445 | 9/2010 |
| CN | 102420869 A | 4/2012 |

OTHER PUBLICATIONS

Bluelock; Monitoring in the Cloud, printed from the web Jun. 14, 2013, 3 pages http://www.bluelock.com/managed-services/monitoring.

(Continued)

*Primary Examiner* — Shean Tokuta

(57) ABSTRACT

A system includes a monitoring attaching service to provide monitoring for a managed service operated on target resources. A search manager can query the monitoring attaching service for a monitoring function that is compatible with a service template that describes the managed service.

16 Claims, 5 Drawing Sheets

(56) References Cited

U.S. PATENT DOCUMENTS

| | | | | |
|---|---|---|---|---|
| 2007/0127694 A1* | 6/2007 | Hajj | H04M 3/5175 | 379/265.06 |
| 2007/0283273 A1* | 12/2007 | Woods | G06F 17/30861 | 715/738 |
| 2008/0034082 A1* | 2/2008 | McKinney | G06F 11/3466 | 709/224 |
| 2010/0042720 A1* | 2/2010 | Stienhans | G06F 9/5072 | 709/226 |
| 2010/0121744 A1* | 5/2010 | Belz | H04M 15/00 | 705/30 |
| 2010/0122119 A1* | 5/2010 | Bildhauer | G06F 11/3409 | 714/47.1 |
| 2010/0198807 A1* | 8/2010 | Kuno | G06F 16/24542 | 707/713 |
| 2010/0235511 A1* | 9/2010 | Kai | G06F 9/445 | 709/226 |
| 2011/0191128 A1* | 8/2011 | Chao | G06Q 10/063 | 705/7.11 |
| 2011/0191351 A1* | 8/2011 | Chao | G06F 16/00 | 707/748 |
| 2011/0209140 A1* | 8/2011 | Scheidel | G06F 8/61 | 717/172 |
| 2011/0307412 A1* | 12/2011 | Rolia | G06Q 10/06 | 705/348 |
| 2012/0066030 A1* | 3/2012 | Limpert | G06Q 10/0639 | 705/7.38 |
| 2012/0072597 A1* | 3/2012 | Teather | G06F 9/5072 | 709/226 |
| 2012/0084413 A1* | 4/2012 | Pasternak | G06F 11/3093 | 709/221 |
| 2012/0084436 A1* | 4/2012 | Pasternak | H04L 12/6418 | 709/224 |
| 2012/0124211 A1* | 5/2012 | Kampas | G06F 9/50 | 709/226 |
| 2012/0130781 A1* | 5/2012 | Li | G06Q 30/0241 | 705/14.4 |
| 2012/0192016 A1* | 7/2012 | Gotesdyner | H04L 12/6418 | 714/47.3 |
| 2012/0222110 A1* | 8/2012 | Huang | H04L 63/1408 | 726/22 |
| 2012/0284365 A1* | 11/2012 | Ma | G06Q 50/10 | 709/217 |
| 2012/0297059 A1* | 11/2012 | Bross | G06F 11/3006 | 709/224 |
| 2013/0007265 A1* | 1/2013 | Benedetti | H04L 67/1097 | 709/224 |
| 2013/0124669 A1* | 5/2013 | Anderson | G06F 11/3006 | 709/217 |
| 2013/0204649 A1* | 8/2013 | Van Antwerp | G06Q 10/0639 | 705/7.11 |
| 2013/0232463 A1* | 9/2013 | Nagaraja | G06F 8/61 | 717/101 |
| 2013/0232497 A1* | 9/2013 | Jalagam | G06F 9/5072 | 718/104 |
| 2014/0278692 A1* | 9/2014 | Marwah | G06Q 10/06312 | 705/7.22 |
| 2019/0036779 A1* | 1/2019 | Bajaj | H04L 41/0816 | |
| 2019/0036780 A1* | 1/2019 | Evans | H04L 41/0806 | |
| 2019/0036816 A1* | 1/2019 | Evans | H04L 43/04 | |

OTHER PUBLICATIONS

CA Technologies; Nimsoft Unified Manager, printed from the web Jun. 14, 2013, http://www.nimsoft.com/solutions/nimsoft-unified-manager/unified-architecture.html.

Dennisehle, Cloud Sidekick Unlocks AWS Cloud Formation for Private and Hybrid Cloud Deployments, May 7, 2013, 2 pages http://www.cloudsidekick.com/news/cloudsidekick_unlocks_cloudformation.

State Intellectual Property Office, International Search Report, May 16, 2013, 11 pages, Beijing, China.

Supplemental European Search Report, European Patent Application No. 12882420.8, dated Mar. 9, 2016, 8 pages.

* cited by examiner

MONITORING FOR MANAGED SERVICES

BACKGROUND

Cloud computing refers to the delivery of scalable and pooled computing, storage and networking capacity as a service to a network of end-recipients. The name comes from the use of clouds as an abstraction for the complex infrastructure of networks and associated hardware operative within the cloud. Cloud computing provides services for a user's data, software and computation over a network, for example. Such computing capability relies on sharing of resources to achieve coherence and economies of scale similar to a utility (like the electricity grid) over a network (typically the Internet).

Managed applications deployed on target resources supporting the cloud can be monitored in order ensure that services, as specified by a service level agreement (SLA) and offered by a service provider, are fulfilled according to the agreement. Presently, complex manual procedures are utilized to determine which monitoring components may be applicable to a given target resource and application. Such procedures often improperly specify an incorrect monitor for a given resource or application and the designer of such systems can inadvertently fail to install a relevant monitor.

DETAILED DESCRIPTION

Systems and methods providing automation of monitoring for managed services are disclosed. Service templates can be generated to specify target resources that can be employed to execute a managed service. Service tags within the service template can be employed to automatically query and retrieve relevant monitoring functions (e.g., monitoring templates or monitoring workflows) offered by a monitoring service. The monitoring functions can be retrieved by matching the service tags with monitoring service tags associated with the monitoring functions. The monitoring functions specify monitoring policies that can be added to the service template to facilitate that monitors can be suitably installed at service runtime to ensure that service level agreements are satisfied. Based on such automated matching of service tags with monitoring tags, relevant monitors for the target resources can be automatically selected and controlled (e.g., deployed, enabled, disabled or removed) while mitigating errors with conventional manual selection and monitor deployment.

Figure 1:
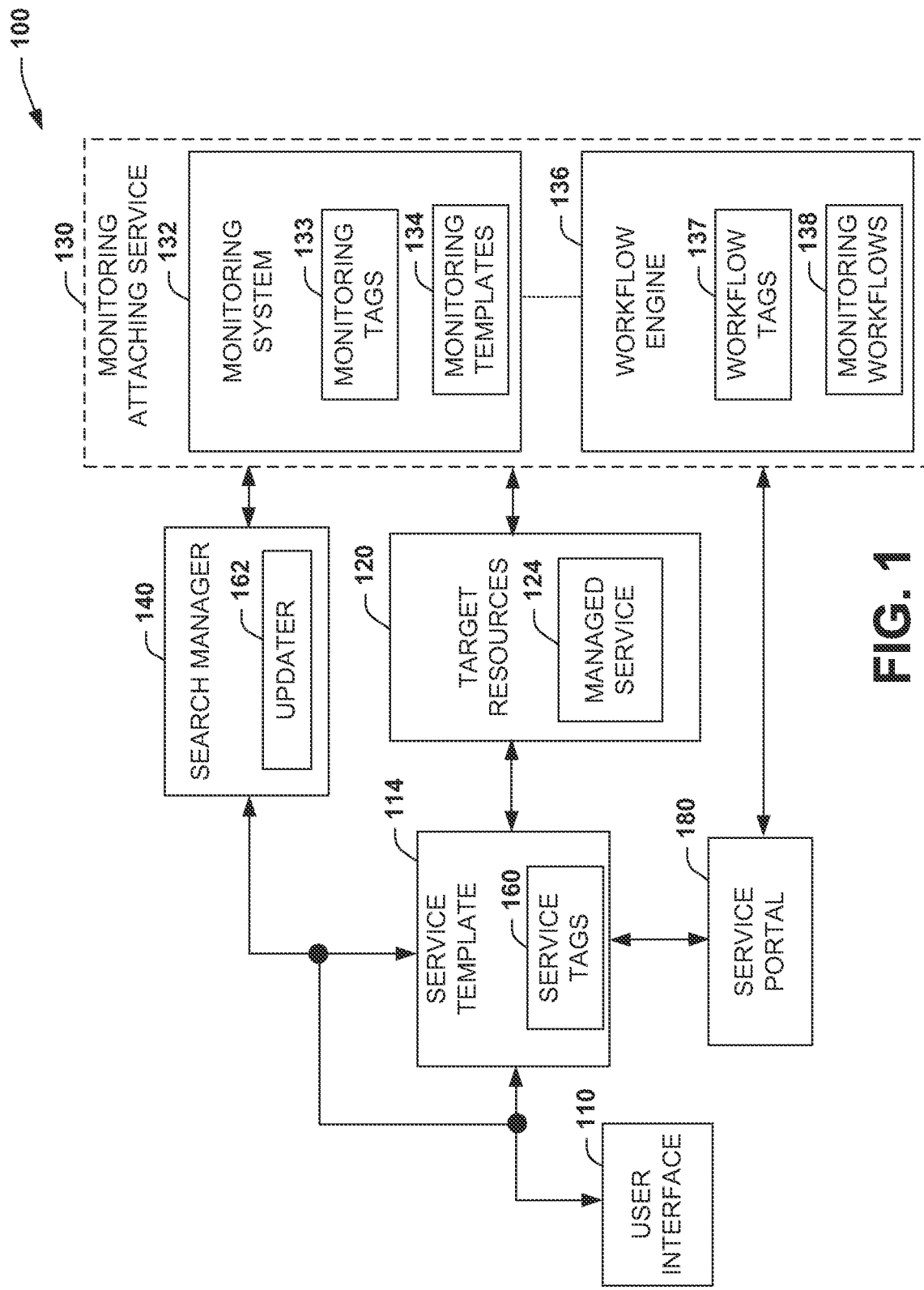
FIG. 1 illustrates an example of a system that facilitates automation of monitoring for managed services.

FIG. 1 illustrates an example of a system 100 that facilitates automation of monitoring for managed services. The system 100 includes a user interface 110 that can be employed to define a service template 114, wherein the service template specifies target resources 120 (e.g., servers, operating systems, disk space, applications, and so forth) that can be employed to execute a managed service 124. The user interface 110 can be employed to display search results of monitoring functions and define execution points for various stages of an application lifecycle (e.g., stages for deploying a monitor, stages for removing a monitor). The managed service 124 can be executable in a cloud computing environment and serviced by a service provider who manages the target resources 120. As used herein the term "cloud" can be a hybrid such that it can be a combination of traditional Data Centers that are made to behave like infrastructure resources, private clouds (cloud technology developed on premise), public clouds (offered by service providers and managed cloud configurations (managed on premise or in a public cloud/virtual private cloud).

A monitoring attaching service 130, corresponding to instructions executable by a processor, provides monitoring for the managed service 124, wherein such monitoring is provided to facilitate that a service level agreement supporting the managed service is being honored. In one example, the monitoring attaching service 130 can include a monitoring system 132 which utilizes a monitoring tag 133 (or tags) to identify a monitoring template 134 (or templates) which describes a policy (or policies) to monitor the target resources 120 and/or managed service 124. In another example, the monitoring attaching service 130 can include a workflow engine 136 which utilizes a workflow tag 137 (or tags) to identify a monitoring workflow 138 (or which) describes a policy (or policies) to monitor the target resources 120 and/or managed service 124. The monitoring template 134 and monitoring workflow 138 can be referred to as monitoring functions of the monitoring attaching service 130.

Typically, the monitoring system 132 or the workflow engine 136 are provided for the monitoring attaching service 130 as described herein although it is possible that both the monitoring system and workflow engine could be utilized collectively in some examples. A search manager 140, also corresponding to instructions executable by a processor, can query the monitoring attaching service 130 for a monitoring function (e.g., monitoring template 134 or monitoring workflow 138) that is compatible with the service template 114 and that describes the managed service 124. Service tags 160 can be specified in the service template 114 to identify the components of the target resources 120 and the managed service 124, whereas monitoring service tags (e.g., monitoring tags 133 or workflow tags 137) can specify various monitoring functions within the monitoring attaching service 130. As used herein, service tags 160 refer to keywords (e.g., metadata describing a component of a managed service or target resource) which can be associated with the service template 114 to identify elements of the target resource 120 or managed service 124 that are to be monitored. Similarly, monitoring service tags (e.g., monitoring tags 133 or workflow tags 137) are keywords utilized to describe monitoring functions within the monitoring attaching service 130 that are available for those resources or applications described by the service template 114.

The search manager 140 automatically queries the monitoring attaching service 130 for the monitoring functions that are compatible (e.g., substantially match service tags with monitoring service tags) with the service tags 160 specified in the service template 114. As used herein, the term "substantially" is intended to indicate that while the function or results of the term being modified are a desired or intended result, some variation can result. In this context, for example, the term "substantially match" describes a situation that the resulting analysis and comparison of tags is performed to identify resources and monitors that are the same; however, in practice the match can correspond to a set of resources and monitors that are sufficiently similar to enable monitor deployment for the managed service. Where more than one such set of monitors might correspond to a match, the search manager 140 can select a best matching set of available resources and monitors. Other approaches for selecting such match can be utilized. Upon identifying the compatible monitoring functions via the search, the service template 114 can be automatically updated, via an updater 162 in the search manager 140, to specify monitors for deployment with the given managed service 124. After updating, the service template 114 can be stored in a service portal 180 which can then be accessed by the monitoring attaching service 130 to determine which monitors to deploy for the managed service 124.

As used herein, the term monitoring attaching service 130 can refer to a dedicated monitoring system, or to a workflow engine whose monitoring workflows interact with a dedicated monitoring system. In some cases, the monitoring system can be separate from the workflow engine. In other examples, the monitoring system and workflow engine can work in conjunction with each other. A method for implementing a monitoring attaching service is illustrated with respect to FIGS. 2-4 and described below.

In some examples, the target resources 120 can be specified by service tags 160 in the service template 114 that enable the search manager 140 to locate the monitoring function, wherein the service tags can include operating system tag data to specify at least one of an operating system type to be installed on a server, an operating system architecture, or an operating system version, for example. The service tags 160 can include application tag data to specify an application type to be installed on the server, an application name, an operating system compatible with the application type, an operating system architecture compatible with the application type, or an operating system version compatible with the application type, for example. The application type can include, and does not limit itself to, specifications for database servers, file transfer protocol (FTP) servers, web servers, application servers, or mail servers, for example.

The monitoring attaching service tag (e.g., monitoring tag 133 or workflow tag 137) describes the monitoring function, wherein the monitoring tag is substantially matched to the service tag 160 by the search manager 140 to determine the monitoring function that is compatible with the service template 114 (e.g., compatibility determined by substantially matching service tag keywords with monitoring service tag keywords). The user interface 110 can display returned monitor function results from the search manager 140 that are compatible with the service template 114 in response to the query. The monitor function results returned by the user interface 110 can be employed to define the monitoring policy at each execution point for each server defined in the service template. In one example, the search manager 140 employs the updater 162 (e.g., processor instructions that modify the service template) to apply the monitoring policy automatically to the service template 114 at each execution point.

As noted above, the monitoring attaching service 130 can be a monitoring system 132 to deploy monitors on the target resources 120, wherein the monitoring system employs monitoring tags 133 to identify the monitoring template 134 which is employed by the monitoring system to describe the monitoring function. The monitoring system 132 can be dedicated to monitoring of the target resources 120 without also assisting in the workflow of the target resources. In another example, the monitoring attaching service 130 can be a workflow engine 136 to deploy monitors on the target resources 120, wherein the workflow engine 136 employs workflow tags 137 to identify the monitoring workflows 138 which are then employed by the workflow engine to provide monitoring of target resources.

In a cloud-based environment, whether private, hybrid or public, service architects often have to design new service templates 114 based on subscriber requirements. As requirements are refined, existing service templates 114 may undergo changes. Since the elements of service templates 114 pertain to target resources 120 that require monitoring, such as to honor service-level agreements, the system 100 can automatically determine appropriate monitors according to the determined monitoring policy and control such monitors at corresponding execution points for the managed services 124. The system 100 automates the process of identifying the required monitoring functions and applies such functions on the elements of the service template 114 during service design. This can reduce the time taken to design new service templates 114 or update existing service templates when their designs may have to be revised. In turn, this can reduce the wait time experienced by subscribers if their requests have to be designed from the beginning and in substantially real-time. It can also reduce the possibility of using incorrect monitoring templates, which can in turn mitigate the scope of human error.

In some examples, the target resources 120 can be provided as part of a cloud-based data center with an implementation of cloud services on hosts and storage systems that are dedicated to one or more departments (e.g., for private clouds) or organizations (e.g., for public clouds) that have subscribed to such services. Thus, subscribers can receive the benefits of self-service, scalability, and elasticity, along with additional advantages of control and customization that are possible from dedicated resources. Managers of cloud-based environments first have to gather possible needs of subscribers and then instruct the respective administrators (of servers, networks, and storage) to provision them as demanded. Based on a service request assigned to an administrator, the target resources 120 can then be provided to the subscriber.

As a further example, target resources 120 provisioned to subscribers should be monitored on a regular basis for a smooth running of the respective data center. To facilitate such operation, an expected clause in service level agreements between a cloud service provider and a subscriber is typically very little downtime and low latency between requests and response. Thus, a cloud service provider should ensure that the data center translates incoming requests into managed services 124 as quickly as possible. This also implies that the data center may have to be available round-the-clock (e.g., 24 hours, 7 days per week). In order to track the utilization of managed services 124, cloud service providers can make use of software such as the monitoring attaching service 130 that monitor the utilization patterns of the managed services 124. The monitoring can be achieved using agents or without using agents. Generally, monitoring can be performed after service requests are translated into managed services 124 and maintained as long as the subscriptions of the managed services are valid.

A typical managed service 124 can be a realization of one or more servers running the same or different operating systems, for example. The monitoring requirements of such managed service 124 in one example can be to track the utilization ratios of disk, central processing unit (CPU), and memory of the servers in the managed service. The managed service 124 can be realized by implementing the service template 114, wherein the typical service template defines the different target resources 120 that are required for implementing in the cloud the managed service, such as server, network, physical memory, and permanent storage, for example.

The service template 114 may also include the provision to install certain applications as demanded by its subscriber. These applications are usually, but not restricted to, database servers, web servers, application servers, mail servers, FTP servers, and so forth, for example. When the service template 114 provides application services, the monitoring requirements can further vary depending on the application. For example, an FTP server may be monitored to track the bandwidth required for data transfer on a daily basis, while a web server may be monitored to track the number of requests it receives on an hourly basis. Thus, if an FTP monitor were improperly specified in place of the web server monitor for a web server application, for example, monitoring of the web server would not occur. The system 100 mitigates such problems by automatically matching specifications of the service tags 160 with the specifications of the monitoring service tags to help ensure that an accurate monitoring policy is executed for each managed service. If the data center also provides application services, then these applications can also be included in the service template 114.

In contrast to a manually implemented approach to identify the required monitoring functions as well as to apply them correctly on the service template 114, the system 100 mitigates errors by automating the process of searching and applying monitoring functions on service templates based on automated matching of the service tags 160 with the monitoring service tags to correctly identify the desired monitor.

For purposes of simplification of explanation, in the example of FIG. 1, different components of the system 100 are illustrated and described as performing different functions. However, one of ordinary skill in the art will understand and appreciate that the functions of the described components can be performed by different components, and the functionality of several components can be combined and executed on a single component. The components can be implemented, for example, computer executable instructions, hardware (e.g., an application specific integrated circuit or a processing unit), or as a combination of both. In other examples, the components could be distributing among remote devices across a network.

Figure 2:
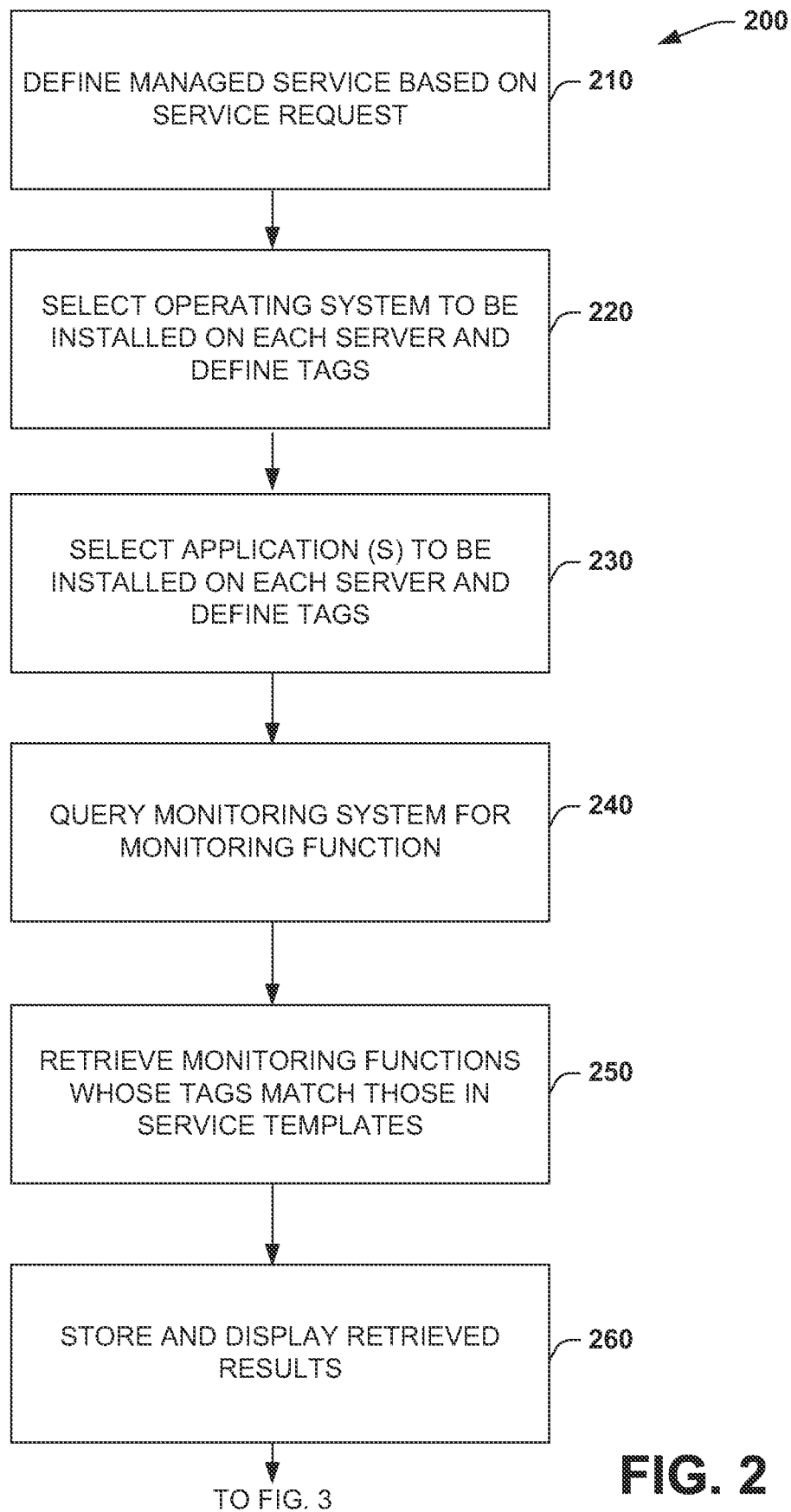
FIGS. 2 and 3 illustrate a flowchart for an example method that facilitates automation of monitoring for managed services utilizing a monitoring service.
Figure 3:
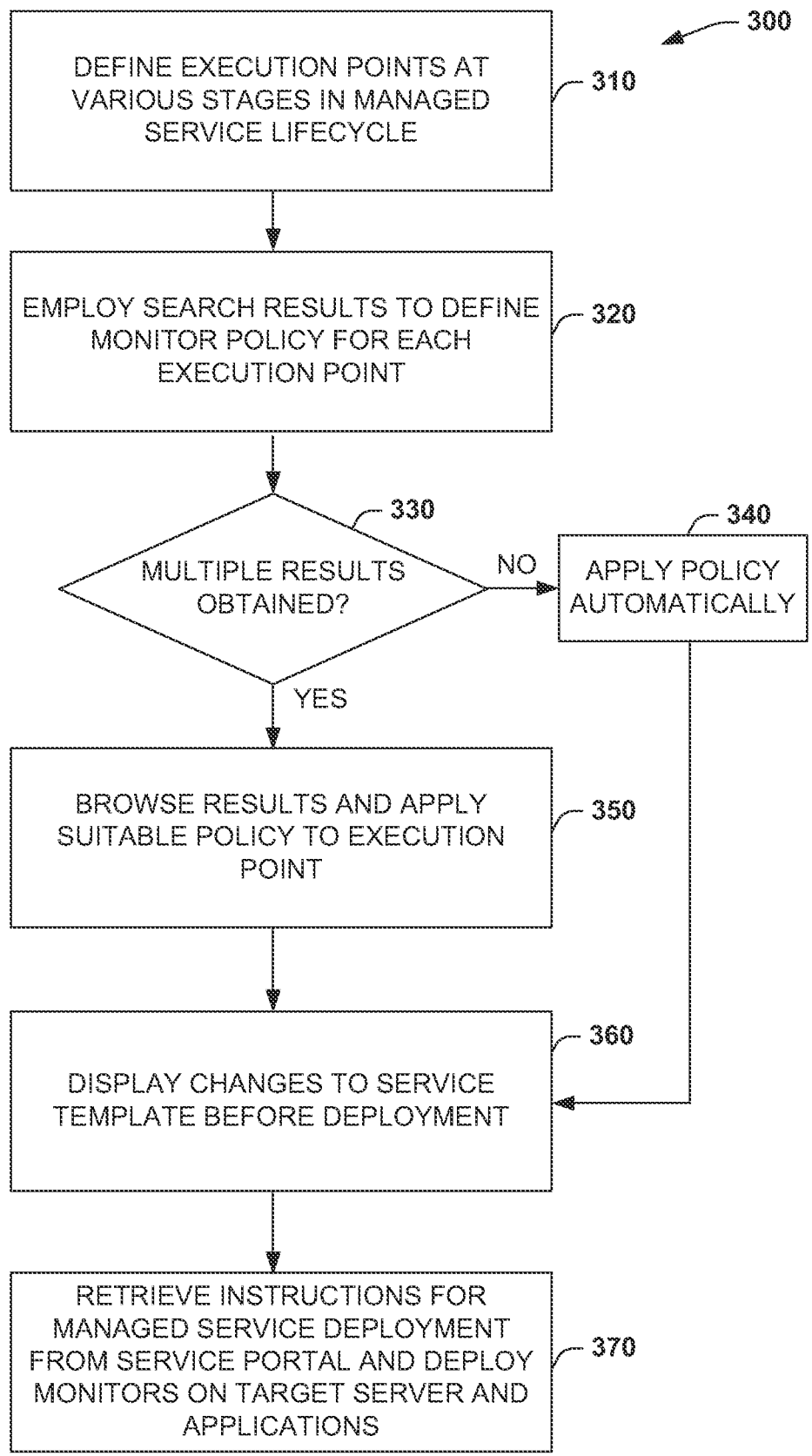
Figure 4:
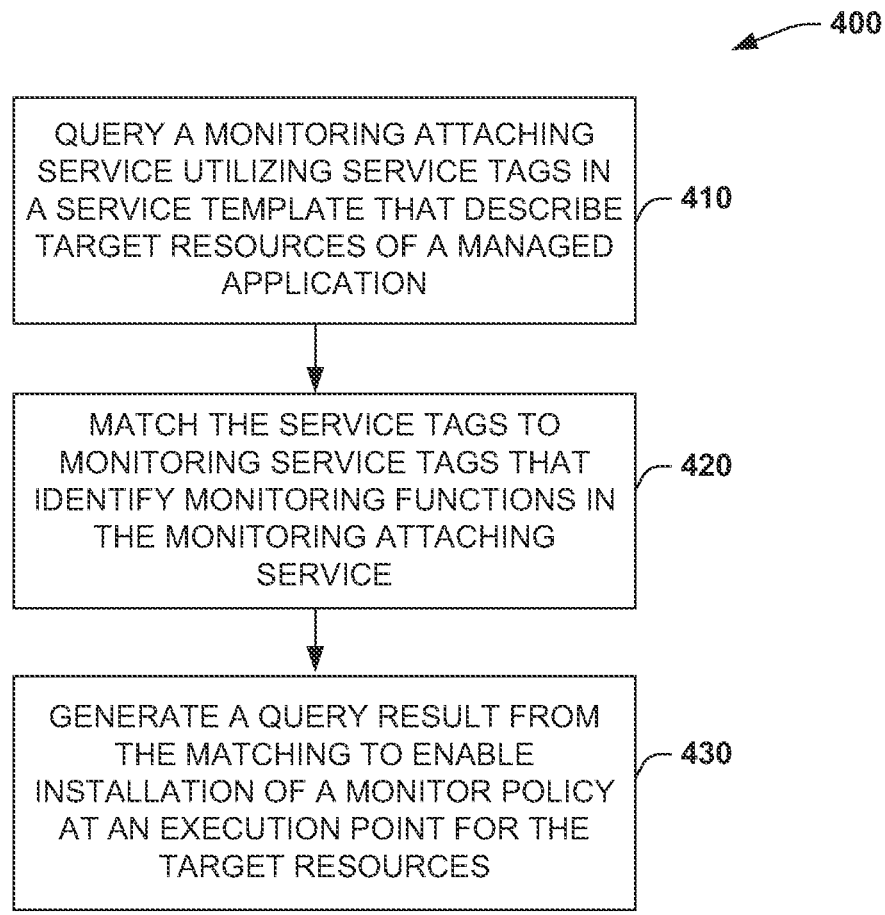
FIG. 4 illustrates a flowchart for an example method that facilitates automation of monitoring for managed services.

In view of the foregoing structural and functional features described above, example methods will be better appreciated with reference to FIGS. 2-4. While, for purposes of simplicity of explanation, the example methods of FIGS. 2-4 are shown and described as executing serially, it is to be understood and appreciated that the present examples are not limited by the illustrated order, as some actions could, in other examples, occur in different orders and/or concurrently from that shown and described herein. Moreover, it is not necessary that all described actions be performed to implement a method. The example methods of FIGS. 2-4 can be implemented as machine-readable instructions that can be stored in a non-transitory computer readable medium, such as can be computer program product or other form of memory storage. The computer readable instructions corresponding to the methods of FIGS. 2-4 can also be accessed from memory and be executed by a processor.

FIGS. 2 and 3 illustrate a flowchart for an example method 200 and 300 that facilitates automation of monitoring for managed services. Such method 200 and 300 can be employed when interacting with a monitoring system or workflow engine described above with respect to FIG. 1. For instance, when a service template is being designed, the architect should be aware of the operating system and application requirements. This awareness can be manifested in the form of tags or keywords for each server in the service template itself as noted above. The stages when monitors should be applied or removed are known. A monitor can be deployed after a service is successfully provisioned and is removed just before the resources of the service are reclaimed. If the service designer is integrated with a workflow engine to automate monitor deployment and removal, the tags of the service template can be used to identify which monitoring workflows are best suited to deploy these monitors. This implies that the workflows should also use tags or keywords for the service designer to identify the workflows.

At 210 of the method 200, a managed service can be defined based on a service request (e.g., via user interface 110 of FIG. 1). The service request can include adding servers, memory, storage, and networks as desired. At 220, the method 200 can include selecting the operating system that should be installed on each server (e.g., specifying keywords in the service template 114 of FIG. 1). This can include generating tags in the service template for each server. The tags can include keywords that describe an operating system, an operating system architecture (e.g., 32 bit tag or 64 bit tag), and/or an operating system version for example. At 230 of the method 200, application(s) that should be installed on each server can be selected, if applicable (e.g., specifying application keywords via service template 114 of FIG. 1). This can include generating tags in the service template for each application. These tags can include an application type, an application name, an operating system, an operating system architecture, and/or an operating system version, for example.

After the service template is ready and the tags have been defined, at 240 of the method 200, query the monitoring system for a suitable monitoring function (or functions) (e.g., via search manager 140 for monitoring templates or monitoring workflows of FIG. 1) that can be applied on the managed service. Here, matching of service template tags with monitoring service tags can be performed by the query to determine suitable monitoring functions for the resources and applications specified in the service template.

At 250 of the method 200, retrieve monitoring functions whose tags substantially match all the service tags in the service template (e.g., via search manager 140 of FIG. 1). For example, all the tags in the service template should have a matching tag in the monitoring function (e.g., monitoring template or monitoring workflow). If no such match is found, an error message can be generated and/or flag set to indicate an error. At 260 of the method 200, results of the query, corresponding to the retrieved monitoring templates, can be stored in memory and displayed (e.g., via a user interface 110 of FIG. 1). Such results can later be employed to enable monitoring policies for various points of execution of a given monitor for a managed service. The method 200 will now be described with respect to the method 300 illustrated in FIG. 3 which is a continuation of the method 200.

At 310 of the method 300 which continues on from 260 of the method 200, define the execution points in the implementation for various stages of the managed service lifecycle (e.g., via user interface 110 of FIG. 1 altering service template). For example, execution points can be provided to perform the following monitor functions: For deploying a monitor, deploy the monitor after the servers are provisioned and powered on; For removing a monitor, un-deploy the monitor just before the server's resources are reclaimed; For disabling a monitor when a server powers off or goes into standby, disable the monitor before the server state changes; and For enabling a monitor after a server powers on or comes out of standby, enable the monitor after the server becomes available again. At 320 of the method 300, employ results of the search for monitoring functions to create/generate the monitoring policy at each execution point for each server described in the service template (e.g., via user interface 110 of FIG. 1). At 330, a decision is made to determine whether multiple search results were obtained. If it is determined at 330 that a single monitoring function result is obtained (single monitoring template or single monitoring workflow returned for a given execution point definition), then the monitoring policy at each execution point can be applied automatically at 340 (e.g., via updater 162 of FIG. 1).

From 340, the method can proceed to 360. If it is determined at 330, however, that more than one search result is obtained, results can be displayed to the user (e.g., to a service architect via user interface 110 of FIG. 1) where the user can browse through the results and select the monitoring policy that should be applied at each execution point at 350 of the method 300. Also, an automated process can be setup to select the best available policy based on a given criteria. At 360 of the method 300, display changes to the service template in order that the service architect can review before making it available for use (e.g., via user interface 110 of FIG. 1). At 370, when the service template is realized into an actual service, the information of the name of the target server, its IP address, operating system, and applications and so forth can be retrieved from the service portal described above with respect to FIG. 1. This information can be fed to the monitoring attaching service in order to deploy monitors on the target server and applications.

FIG. 4 illustrates a flowchart for an example method 400 that facilitates automation of monitoring for managed services. At 410, the method 400 includes querying a monitoring attaching service, by a computer (e.g., via search manager of FIG. 1), utilizing service tags in a service template that describe target resources of a managed application. At 420, the method 400 includes matching, by the computer (e.g., via search manager of FIG. 1), the service tags to monitoring service tags that identify monitoring functions in the monitoring attaching service. At 430, the method 400 can include generating, by the computer (e.g., via search manager of FIG. 1), a query result from the matching to enable installation of a monitor policy at an execution point for the target resources. Although not shown, the method 400 can also include automatically applying the monitoring policy to the service template after generating the query result.

Figure 5:
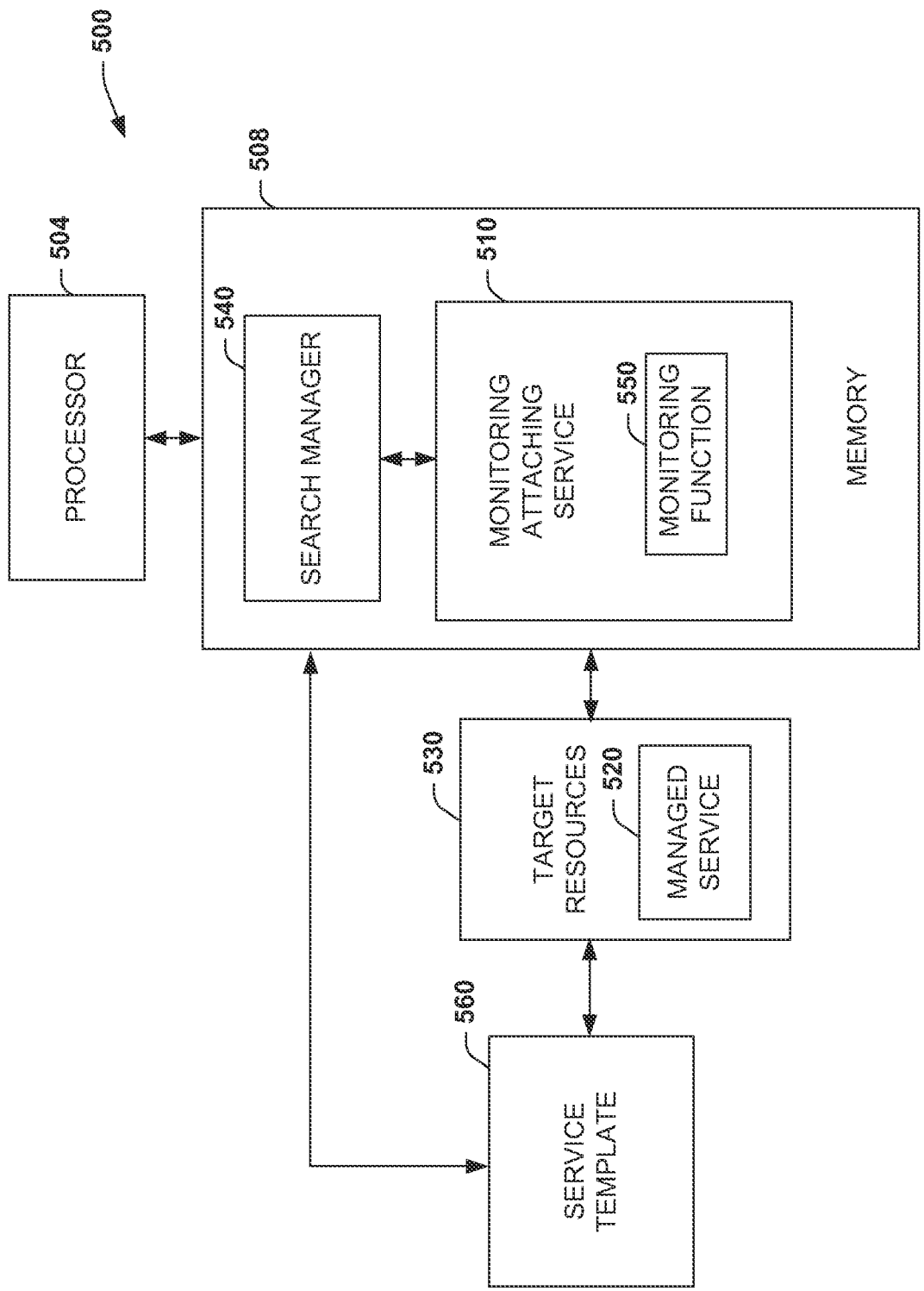
FIG. 5 illustrates an example system for automation of monitoring for managed services.

FIG. 5 illustrates an example system 500 for automaton of monitoring for managed services. As shown, the system 500 can include a processor 504 that executes instructions in a memory 508. The memory 508 includes a monitoring attaching service 510, corresponding to instructions executable by the processor 504, to provide monitoring for a managed service 520 operated on target resources 530. A search manager 540, corresponding to instructions executable by the processor 504, can query the monitoring attaching service 510 for a monitoring function 550, or that is compatible with a service template 560 that describes the managed service 520.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system comprising:
   a memory to store machine-readable instructions; and
   a processor to access the memory and to execute the machine-readable instructions to cause the processor to:
      access data representing a service template associated with a managed service and comprising service tags describing target resources operated on by the managed service, wherein the managed service is provided by a service provider;
      provide a query, the query representing a request to identify a first monitoring template of a plurality of monitoring templates in response to the first monitoring template comprising monitoring tags that match the service tags, wherein the monitoring tags represent a monitoring service being available to monitor the target resources to determine compliance of the managed service with a service level agreement;
      in response to the query, receive a query result representing identification of the first monitoring template; and
      modify the service template, based on the first monitoring template, to specify a monitor for deployment with the managed service.

2. The system of claim 1, wherein a given service tag of the service tags includes operating system tag data to specify at least one of an operating system type to be installed on a server, an operating system architecture, or an operating system version.

3. The system of claim 2, wherein the given service tag includes application tag data to specify an application type to be installed on the server, an application name, an operating system compatible with the application type, an operating system architecture compatible with the application type, or an operating system version compatible with the application type.

4. The system of claim 3, wherein the application type includes database servers, file transfer protocol (FTP) servers, web servers, application servers, or mail servers.

5. The system of claim 1, wherein the instructions are executed by the processor to cause the processor to display monitor function results in response to the query.

6. The system of claim 5, wherein the instructions are executed by the processor to cause the processor to define an execution point for deploying, removing, enabling, or disabling a monitoring policy at a defined execution point for the managed service.

7. The system of claim 6, wherein the service template defines a plurality of servers, each server of the plurality of servers comprises a plurality of execution points, and the instructions are executed by the processor to cause the processor to define the monitoring policy at the plurality of execution points.

8. The system of claim 7, wherein the instructions are executed by the processor to cause the processor to apply the monitoring policy automatically to the service template at each execution point.

9. The system of claim 1, wherein the instructions are executed by the processor to cause the processor to deploy monitors on the target resources based on the first monitoring template.

10. The system of claim 1, wherein the instructions are executed by the processor to cause the processor to deploy monitors on the target resources, employ monitoring workflows to describe a monitoring function and workflow tags to identify the monitoring workflows for the query.

11. The system of claim 1, wherein the managed service comprises a cloud service.

12. A method comprising:
   a computer querying a monitoring attaching service that provides monitoring for a managed service operated on target resources of a managed application to, based on service tags of a service template that describes the managed service, identify a monitoring template, wherein the managed service is provided by a service provider and the service tags describe the target resources;
   matching, by the computer, the service tags to monitoring service tags associated with the monitoring template to identify the monitoring template, wherein the monitoring service tags represent a monitoring service being available to monitor the target resources to determine compliance of the managed service with a service level agreement;
   returning, by the computer, a query result based on the matching to enable installation of a monitoring policy at an execution point for the target resources; and
   modify the service template, based on the monitoring template, to specify a monitor for deployment with the managed service.

13. A non-transitory machine readable storage medium to store instructions that, when executed by a machine, cause the machine to:
   access data representing a service template associated with a managed service and comprising service tags describing target resources operated on by the managed service, wherein the managed service is provided by a service provider;
   provide a query, the query representing a request to identify a first monitoring template of a plurality of monitoring templates in response to the first monitoring template comprising monitoring tags that match the service tags, wherein the monitoring tags represent a monitoring service being available to monitor the target resources to determine compliance of the managed service with a service level agreement;
   in response to the query, receive a query result representing identification of the first monitoring template; and
   modify the service template, based on the first monitoring template, to specify a monitor for deployment with the managed service.

14. The storage medium of claim 13, wherein a given service tag of the service tags includes operating system tag data to specify at least one of an operating system type to be installed on a server, an operating system architecture, or an operating system version.

15. The storage medium of claim 14, wherein the given service tag includes application tag data to specify an application type to be installed on the server, an application name, an operating system compatible with the application type, an operating system architecture compatible with the application type, or an operating system version compatible with the application type.

16. The storage medium of claim 15, wherein the application type includes database servers, file transfer protocol (FTP) servers, web servers, application servers, or mail servers.

* * * * *